US012754973B1

(12) United States Patent
Gorman et al.

(10) Patent No.: US 12,754,973 B1
(45) Date of Patent: Oct. 6, 2026

(54) STAGED UNDEFINED OBJECT MEMORY AND BANDWIDTH BLOAT HETEROGENEITY CORRECTION

(71) Applicant: THE HUNTINGTON NATIONAL BANK, Columbus, OH (US)

(72) Inventors: Timothy Gorman, Columbus, OH (US); Afnan Rehman, Dublin, OH (US); Gosia Rehfus, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/366,909

(22) Filed: Oct. 23, 2025

(51) Int. Cl.

| | |
|---|---|
| ***G06F 18/22*** | (2023.01) |
| ***G06F 12/02*** | (2006.01) |
| ***G06F 18/23213*** | (2023.01) |
| ***G06N 3/0475*** | (2023.01) |

(52) U.S. Cl.
CPC ............ *G06F 18/22* (2023.01); *G06F 12/023* (2013.01); *G06F 12/0292* (2013.01); *G06F 18/23213* (2023.01); *G06N 3/0475* (2023.01)

(58) Field of Classification Search
CPC ............... G06F 18/22; G06F 18/23213; G06F 12/023; G06F 12/0292; G06N 3/0475
USPC .......................................................... 707/812
See application file for complete search history.

(56) References Cited

U.S. PATENT DOCUMENTS

| | | | | |
|---|---|---|---|---|
| 12,423,311 | B1 * | 9/2025 | Stoll | G06F 16/24578 |
| 2018/0139482 | A1 * | 5/2018 | Bhatia | H04N 21/25808 |
| 2019/0286753 | A1 * | 9/2019 | Feng | G06F 16/24578 |
| 2021/0064854 | A1 * | 3/2021 | Chen | G06Q 20/40 |
| 2022/0043935 | A1 * | 2/2022 | Brannon | G06F 16/332 |
| 2024/0020169 | A1 * | 1/2024 | Fenzl | G06N 20/00 |
| 2024/0419641 | A1 * | 12/2024 | Gandhi | G06F 16/215 |
| 2025/0106416 | A1 * | 3/2025 | Zhang | H04N 19/172 |
| 2025/0321984 | A1 * | 10/2025 | Inampudi | G06F 16/287 |

* cited by examiner

*Primary Examiner* — Amy Ng
*Assistant Examiner* — Antonio J Caiado
(74) *Attorney, Agent, or Firm* — Kilpatrick Townsend & Stockton LLP

(57) ABSTRACT

Techniques are described herein for staged undefined object heterogeneity optimization. A method may access an undefined object from a list compiled from disparate computer systems, each with an undefined object identifier. The method determines similarity scores by accessing a data source of predefined data objects, comparing the undefined object identifier with each predefined object identifier, and generating a similarity score for each pair. When a similarity threshold is met, a corresponding predefined object is identified. The method then generates a first updated list by removing the undefined object from the original list and causes the respective computer system to overwrite the undefined object in memory with the predefined object. The predefined object uses less memory than the original, enabling more efficient data normalization, reduced storage requirements, and improved processing efficiency across systems. This staged approach supports automated transformation of heterogeneous data into standardized formats for scalable and resource-efficient data management.

20 Claims, 7 Drawing Sheets

200

STAGED UNDEFINED OBJECT MEMORY AND BANDWIDTH BLOAT HETEROGENEITY CORRECTION

BACKGROUND

Proliferation of data storage systems and information repositories in computing environments has led to the aggregation of data elements from diverse sources, each of which may employ unique naming conventions, formats, and contextual encodings. This heterogeneity poses significant challenges to efficient data management, retrieval, and interoperability, as memory systems must frequently contend with the task of interpreting and standardizing non-uniform, unreadable, or ambiguously labeled data elements. Accordingly, there is an unmet need for scalable, resource-efficient methodologies that can systematically convert heterogeneous data elements into unified, readable formats within a memory architecture.

BRIEF SUMMARY

Techniques are provided for staged undefined object memory and bandwidth bloat heterogeneity correction. Various embodiments are described herein, including methods, systems, non-transitory computer-readable storage media storing programs, code, or instructions executable by one or more processors, and the like.

According to various embodiments, a computer-implemented method for staged undefined object heterogeneity optimization, the computer-implemented method comprising: accessing an undefined object from a first list of undefined objects compiled from disparate computer systems, wherein the undefined object is identified by an undefined object identifier; determining a set of similarity scores for the undefined object by at least: accessing a data source comprising a set of predefined data objects that each have a predefined object identifier; comparing the undefined object identifier of the undefined object with each predefined object identifier in the set of predefined data objects; and generating, for each pair of a predefined object identifier and the undefined object identifier, a similarity score that represents similarity between the undefined object identifier and a respective predefined object identifier; determining a particular predefined object from the set of predefined data objects in accordance with a similarity threshold; generating a first updated list by removing the undefined object from the first list; and causing a particular computer system of the disparate computer systems to update the undefined object stored on a memory of the particular computer system by overwriting at least a portion of the undefined object with the particular predefined object, wherein the particular predefined object has a lower memory foot print compared to the undefined object.

According to various embodiments, the computer-implemented method further comprises: determining an input for a production generative model by compiling remaining undefined objects of the first updated list, wherein the production generative model is based at least in part on a set of ground truth training examples and a selected data structure that partitions the set of ground truth training examples into a defined data structure based at least in part on the set of predefined data objects, and wherein the first updated list has a lower memory footprint that the first list; providing the input in a prompt to the production generative model; receiving, as output from the production generative model, a post-defined object for each remaining undefined object in the first updated list; and generating a second updated list by overwriting each remaining undefined object in the first updated list, wherein the second updated list has a reduced memory footprint compared to the first updated list.

According to various embodiments, the computer-implemented method further comprises: causing each respective disparate computer system of the disparate computer systems associated with the remaining undefined objects to update the remaining undefined objects stored on respective memories of each respective disparate computer system, respectively, by overwriting the remaining undefined object with the post-defined object, wherein the post-defined object has a lower memory footprint than the remaining undefined object.

According to various embodiments, the data source is a pre-defined look-up table.

According to various embodiments, the computer-implemented method further comprises: receiving, from an edge device associated with a computer system of the disparate computer systems, a request for defined objects associated with a context; generating a context file based at least in part on the first updated list, the second updated list, or both, that comprises a plain English term for each undefined object, each remaining undefined object, or both associated with the context, a plain English definition for each undefined object, each remaining undefined object, or both, associated with the context; and causing the context file to be distributed to the edge device.

According to various embodiments, the computer-implemented method further comprises: receiving, from an edge device associated with a computer system of the disparate computer systems, a request for defined objects associated with a context; and causing the edge device to display, using an application programmable interface (API), a subset of objects of the updated list, the second updated list, or both based at least in part on the context, wherein the subset of objects are associated with the defined objects.

According to various embodiments, the computer-implemented method further comprises: clustering the undefined objects into similarity groups based at least in part on a categorization score, wherein the first list includes a first category list and a second category list, wherein undefined objects that occur in the first category list are not provided to the production generative model and undefined objects that occur in the second category list are provided to the production generative model.

At least one embodiment is directed to a computing device comprising one or more processors and one or more memories storing computer-executable instructions that, when executed by the one or more processors, cause the one or more processors to perform the method(s) disclosed herein.

At least one embodiment is directed to a non-transitory computer-readable storage medium storing computer-executable instructions that, when executed with one or more processors of a computing device, causes the one or more processors to perform the method(s) disclosed herein.

BRIEF DESCRIPTION OF THE DRAWINGS

Various embodiments in accordance with the present disclosure will be described with reference to the drawings, in which.

DETAILED DESCRIPTION

Figure 1:
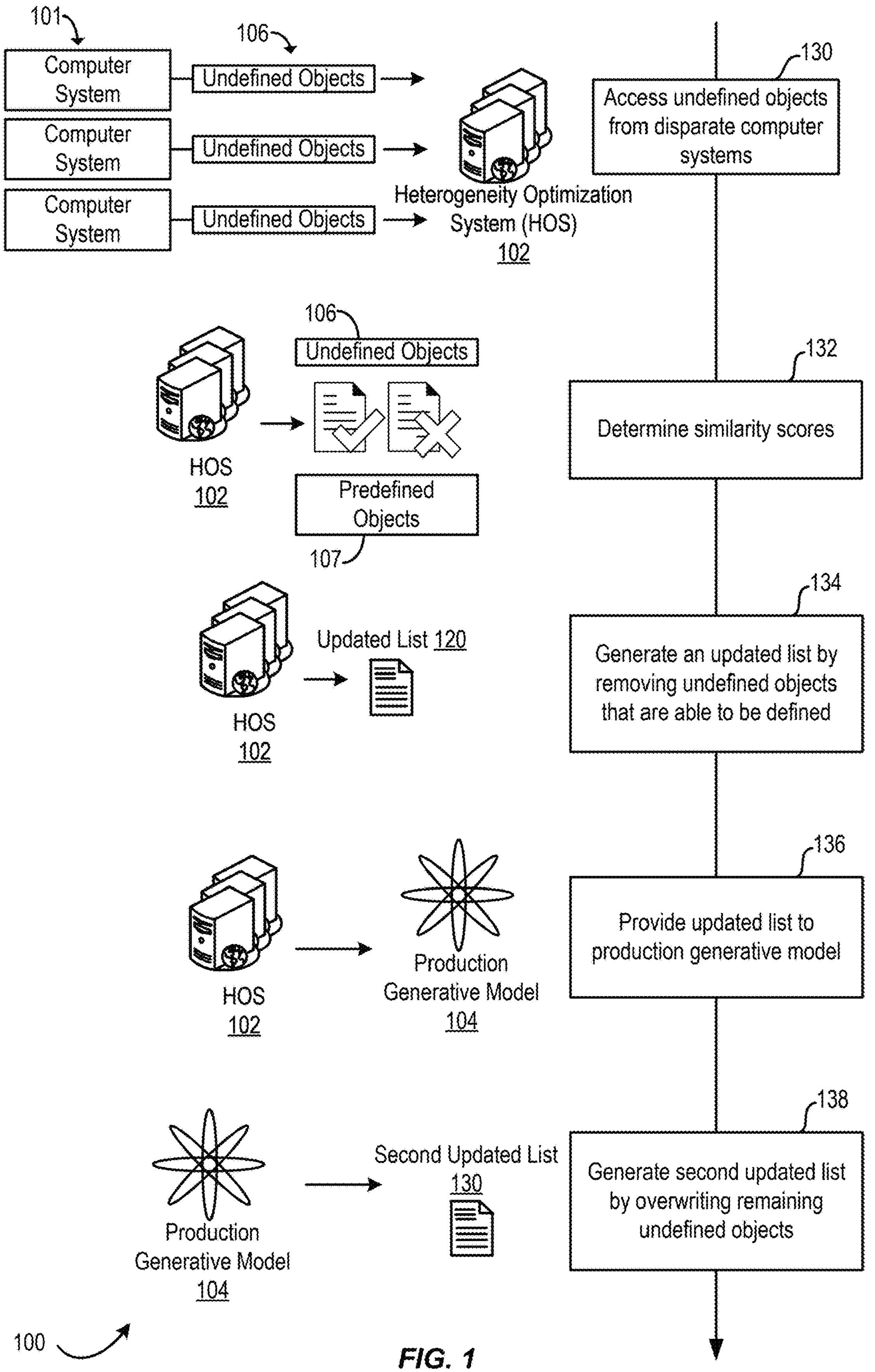
FIG. 1 is a simplified diagram of an example method for staged undefined object heterogeneity optimization, according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the process (or any other processes described herein, or variations, and/or combinations thereof) may be performed under the control of one or more computer systems configured with executable instructions, and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In data environments, organizations routinely aggregate immense volumes of information from a variety of disparate computer systems, each engineered with its own unique storage conventions, field definitions, and naming schemes. These systems may span different departments, vendors, legacy applications, and platforms, resulting in data objects that vary wildly in structure, content, and length. For instance, one database might store a location description as a soil moisture reading as "SENSOR_NODE.SOIL_MOISTURE," another records a crop treatment event as "FIELD_ACTIVITY_LOG," and a third refers to a weather station identifier simply as "WX2048." The lack of standardized formatting leads to data entries that are not only cryptic and inconsistent but also generally unrecognizable to anyone attempting to read or analyze the data without specialized knowledge of each system's schema.

This challenge becomes apparent when considering a scale of modern datasets. In fields such as environmental monitoring, scientific research, or public archives, data aggregation efforts can result in hundreds of millions or even billions of individual entries per year. Each entry may range from a short numeric identifier to a multi-level, dot-separated string, with memory sizes fluctuating from a handful of bytes to several kilobytes depending on the complexity and verbosity of the data. For example, compiling entries from multiple sources can result in a dataset where _RECORD. SOIL_MOISTURE," "SENSOR_TEMP," and "CROP_TYPE" are represented in a dozen different formats. The diversity of entries not only inflates storage requirements but also impedes the ability to efficiently process or interpret the information. Manual review and normalization of such datasets demand thousands of hours annually, as data stewards work line-by-line to assign each object to its correct category, a process that is both time-consuming and susceptible to error.

This complexity may be compounded by regulatory requirements that demand data be recognizable, standardized, and interpretable for reporting and compliance purposes. Regulatory agencies in domains such as agricultural oversight, environmental protection, environmental science, or governmental oversight frequently mandate submissions with clear, plain-English field names and consistent formats. If a regulatory report requires fields like "Soil Moisture Level" or "Plot Description," but the data is stored under opaque labels such as "AGRISYS1.FIELD_SENSOR.SOIL_MOIST" or "ENV_NET.PLOT_DESC," the submission may fail compliance checks or be rejected outright. Translating these heterogeneous entries into simple, predefined terms such as "Soil Moisture Level" not only ensures regulatory compliance but also streamlines subsequent data analysis and decision-making. Standardized fields occupy less memory and facilitate more efficient querying, enabling organizations to quickly generate insights without the overhead of parsing or reconciling incompatible formats.

According to various embodiments herein, techniques are provided for staged undefined object heterogeneity optimization. In an initial stage, a list of undefined objects may be accessed and compiled from disparate systems and references a set of predefined object identifiers for normalization. A system may compare each undefined object identifier to the predefined set, calculating similarity scores to identify matches that meet a designated threshold. When a match is found, the undefined object is replaced with the corresponding predefined object, overwriting the original data to reduce the memory footprint of the dataset and improve clarity for what the object pertains to. For example, a field labeled "AGRODATA1.SENSOR_GRID.MOIST_ID" might be replaced with the standardized term "Moisture Sensor ID," or "AGRISYS1.FIELD_SENSOR.SOIL_MOIST" might be replaced with "Soil Moisture Level," simplifying each entry and making it recognizable for downstream reporting and analysis. This accelerates normalization but also obviates a need for extensive manual intervention that results in a compact, compliant dataset that is ready for efficient processing.

In various embodiments, systems and methods utilizing the two-stage approach provide memory savings when aggregating and normalizing large volumes of data compiled from disparate computer systems. For example, when aggregating hundreds of millions of data entries per year from numerous sources, each entry may include undefined object identifiers comprising lengthy, system-specific strings that can significantly increase memory needed for storage. By implementing the two-stage optimization process, embodiments herein access a compiled list of undefined objects and compare each identifier to a set of predefined object identifiers using similarity scoring. When a match that meets a designated threshold is identified, techniques herein overwrite the original undefined object with its corresponding predefined term, which needs fewer bytes per entry. As a result, an overall memory footprint of the dataset is reduced (e.g., a reduction from hundreds of gigabytes to only a fraction of the original size). In addition to memory optimization, the techniques herein yield significant reductions in processing power needed for data normalization and reporting across large datasets. Conventional approaches may need manual review and mapping of undefined objects, demanding thousands of hours annually and imposing heavy computational loads due to repeated string comparisons and lookups. By employing the two-staged undefined object optimization systems and methods herein, systems and methods herein automate the identification and replacement of undefined objects via similarity scoring, while unresolved entries are further processed through a production generative model trained on representative examples and predefined data structures. This automated parallelized method may reduce the average processing time per entry (e.g., several tenths of a second to hundredths of a second) enabling analyzing of entire datasets in a fraction of the time and with lower CPU utilization.

FIG. 1 is a simplified diagram of an example method 100 for staged undefined object heterogeneity optimization, according to certain embodiments. The method 100 involves a system of networked disparate computer systems 101 across one or more industries (e.g., environmental, medical, manufacturing, finance, etc.) that have aggregated data in accordance with respective standards, database schema, and/or conventions. At 130, a heterogeneity optimization system (HOS) 102 may access undefined objects 106 from the disparate computer systems 101 in order to begin a one or two-stage optimization of the data to reduce a memory footprint and/or processing power needs of subsequent systems that access the data.

At 132, the HOS 102 may determine similarity scores between the undefined objects 106 and predefined data objects. The predefined data objects 107 may include known predefined object identifiers and definitions associated with the predefined object identifiers to aid in identifying a context associated with the predefined object identifiers. Each of the undefined objects 106 may be assessed based on similarities with the predefined data objects 107. This initial stage addresses the challenge of aggregating data entries from disparate computer systems, where each entry may be labeled with a system-specific object identifier such as "SENSORGRID1.FIELD_MONITOR.SENSOR_ID . . . " or "AGRODATA2.CROP_RECORD.TREATMENT_CODE . . . " These undefined objects 106 may be verbose (e.g., several hundred to thousands of lines long for a single entry) and occupy substantial memory due to their variable length and complexity. By comparing each undefined object identifier to a curated set of predefined object identifiers (e.g., "Sample ID," "Diagnosis Code," or "Location Description"), the HOS 102 uses similarity scoring to quantify how closely each undefined object matches a known, standardized term. For example, a similarity score may be calculated based on string matching, semantic analysis, or contextual metadata, enabling the system to recognize that "SENSORGRID1.FIELD_MONITOR.SENSOR_ID . . . " should be mapped to "Sensor ID." This first stage is executed automatically and at scale, providing a basis for savings in both memory and processing power as verbose and inconsistent identifiers are replaced with concise, standardized terms.

At 134, the HOS 102 may generate an updated list 120 by removing undefined objects 106 that are able to be defined based at least in part on the predefined data objects 107. For example, for associated undefined objects 106 that have an associated predefined object 107 based on the similarity score, the undefined objects 106 may be overwritten with at least an associated predefined object identifier, definition, or other metadata to make the undefined object 106 readily interpretable. Upon identifying matches through the similarity scoring, the HOS 102 may overwrite each matched undefined object with its corresponding predefined object identifier and, where appropriate, an associated definition or metadata. For instance, the undefined object "AGRODATA2.CROP_RECORD.TREATMENT_CODE" may be replaced with "Treatment Code" and a definition such as "Standardized code representing a crop treatment." This direct substitution streamlines the dataset making it more interpretable for downstream analytics and regulatory reporting as well as resulting in a significant reduction in memory usage. The updated list 120, now containing standardized entries, is more compact and accessible reducing an amount of "work" a generative model will need to do to analyze the remaining entries.

At 136, the HOS 102 may provide the updated list 120 to a production generative model 104. The updated list 120, now reduced from initially containing all undefined objects 106 from the computer systems 101, may be provided in a prompt to the production generative model 104. By way of a non-limiting example, for any undefined objects 106 that could not be matched to a predefined object in the first stage, the HOS 102 proceeds to a second stage. The remaining undefined objects 106 in the updated list 120 are compiled and provided as input to a production generative model 104 (e.g., a large language model trained on ground truth examples and structured data). This production generative model 104 may analyze the context and features of each unresolved undefined object 106, such as "MOISTURE LEVEL" or "SENSOR TYPE" and infer a most likely standard term or classification.

At 138, the production generative model 104 may generate a second updated list by overwriting remaining undefined objects 106. By way of a non-limiting example, the production generative model 104 may outputs a second updated list 130 in which each remaining undefined object 106 has been overwritten with a post-defined object identifier and, optionally, its associated definition or metadata. This transformation ensures that the entire dataset is now composed of concise, interpretable, and memory-efficient entries.

Figure 2:
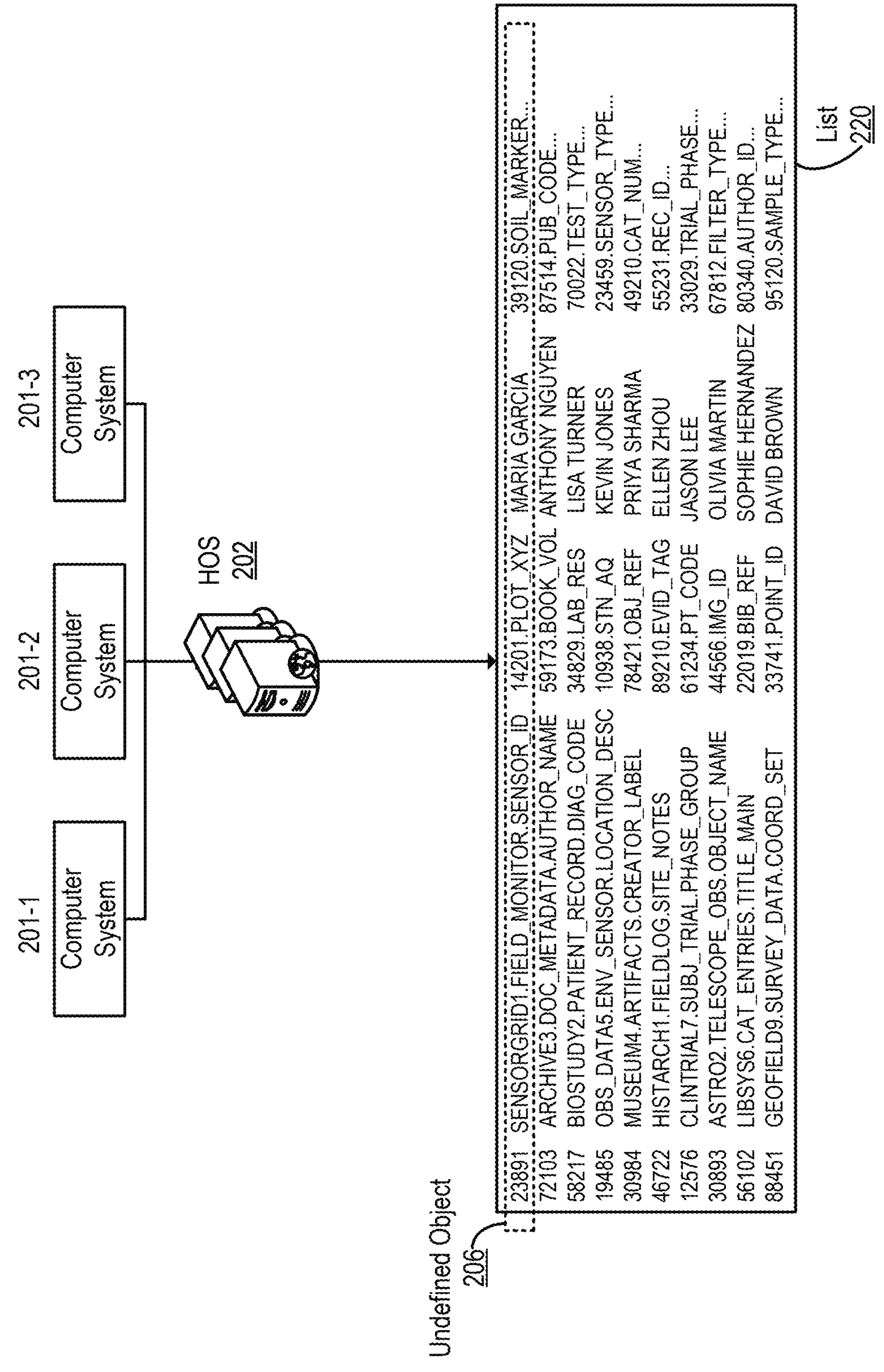
FIG. 2 is a simplified diagram of example list of undefined objects, according to certain embodiments.

FIG. 2 is a simplified diagram 200 of example list of undefined objects 206 received from disparate computer systems 201, according to certain embodiments. The computer systems 201 may be associated with various platforms (e.g., different software platforms), industries, and/or businesses. The computer systems 201 may provide the undefined objects 206 in one or more files where the HOS 202 (which is an example of HOS 102 with respect to FIG. 1) and aggregate the information into a list. In some examples, the list may be aggregated as raw data, structured data in accordance with a predefined ruleset (e.g., categorized by which computer system 201 sent the data), and/or a combination of raw data and structured data. In various embodiments, the list may include blanks since not all computer systems store data in the same manner (e.g., same number of rows, columns, etc.) and the HOS 202 may insert fields such as "not available" or similar.

As a result of aggregating undefined objects 206 from this heterogeneous ecosystem of computer systems 201, the HOS 202 may need to reconcile dissimilar data extraction protocols, communication formats, and/or interoperability standards. For instance, a set of entries sourced from a legacy inventory system may arrive as fixed-width text records, while contributions from a cloud-native IoT platform are delivered as nested JSON objects with dynamic field counts. The HOS 202 may update records in real time, producing streaming data feeds or export static batch files only at periodic intervals. Beyond differences in file formats and missing fields, the HOS 202 may address these differences and ambiguities at a semantic level. For example, computer system 202-1 may use cryptic field names like "STN_AQ" and computer system 201-2 may use "LAB_RES," which are not self-explanatory and may, in some cases, overlap in meaning with clearer terms from other systems, like "Location Description" or "Test Type". Moreover, some data sources may include custom extensions or metadata, such as version stamps, local codes, or context-specific tags, which need specialized parsing logic to interpret or standardize.

The HOS 202 may use data intake models capable of automated schema detection, field mapping, and/or quality assessment prior to defining the undefined objects 206. These intake models can identify and reconcile discrepancies in row and column counts, data types, and value ranges, flagging anomalies for review or applying corrective transformations. In cases where records are incomplete or contain gaps, the HOS 202 may insert standardized placeholders such as "not available" so that the downstream processes (e.g., similarity scoring, generative modeling, or regulatory reporting) may operate on structurally consistent datasets even when the underlying data landscape is fragmented or evolving.

Figure 3:
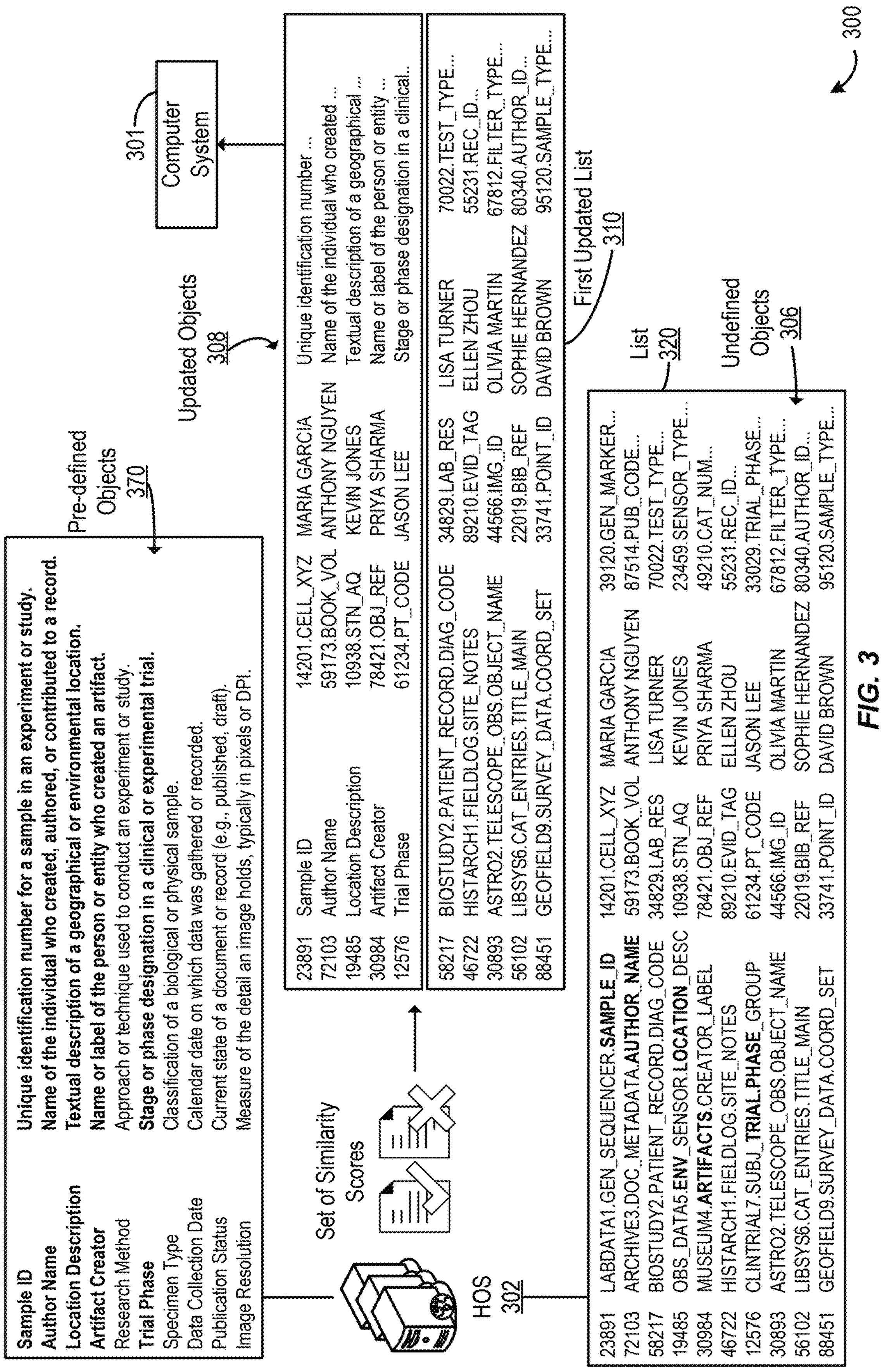
FIG. 3 is a simplified diagram of example first stage of a method for staged undefined object heterogeneity optimization using similarity scores of pre-defined objects based on a data source, according to certain embodiments.

FIG. 3 is a simplified diagram 300 of example first stage of a method for staged undefined object heterogeneity optimization using similarity scores of pre-defined objects based on a data source, according to certain embodiments. In this example, a HOS 302 (which is an example of HOS 202 with respect to FIG. 2) may aggregate undefined objects 306 from one or more computer systems 301 into an ordered list 320 and perform one or more comparisons with respect to pre-defined objects 370 which include known object identifiers (e.g., Sample ID, Author Name, etc.) and definitions (e.g., Unique identification number for a sample in an experiment or study, name of the individual who created, authored, or contributed to a record, etc.) associated with the object identifiers.

The HOS 302 may apply a similarity scoring model to compare each undefined object 306 in the list 320 with the predefined object identifiers. The similarity scoring models may utilize a quantitative analysis of string similarity, semantic relationships, and/or contextual metadata. For example, the undefined object 306 "SENSORGRID1.FIELD_MONITOR._SENSOR_ID" may be compared to the predefined object identifier "Sensor ID." The presence of the terms "SENSOR" and "ID" within the undefined object 306, along with contextual clues from its associated definition, results in a high similarity score. If this score exceeds a similarity threshold, such as 0.85 on a normalized scale, the HOS 302 may determine that a match exists and overwrites "LABDATA1.GEN_SEQUENCER.SAMPLE_ID" with "Sample ID" and its definition.

Similarly, "ARCHIVE3.DOC_METADATA.AUTHOR_NAME" is evaluated against "Author Name" because the term "AUTHOR_NAME" is explicitly present, the similarity score approaches 1.0, confirming a strong match. Another example is "OBS DATA5.ENV_SENSOR.LOCATION_DESC," which is compared to "Location Description". The algorithm recognizes "LOCATION_DESC" as an abbreviation for "Location Description" leading to a high similarity score and successful mapping. Further, "MUSEUM4.ARTIFACTS.CREATOR_LABEL" is compared to "Artifact Creator" and the presence of "CREATOR" in both terms and the supporting context from the definition facilitate a match. In the case of "CLINTRIAL7.SUBJ_TRIAL.PHASE_GROUP" the similarity model may identifies the "PHASE" component relates it and to "Trial Phase". For "ASTRO2_" the HOS 302 may matches this entry to "Object Name" and for "LIBSYS6.CAT_ENTRIES.TITLE_MAIN" the similarity with "Book Title" is identified through textual overlap. In addition, the similarity scoring model may also handle partial matches and abbreviations. For example, "GEOFIELD9.SURVEY_DATA.COORD_SET" is compared to "Coordinate Set". The abbreviation "COORD_SET" is recognized and mapped accordingly. If an undefined object 306, such as "CELL_XYZ" or "LAB_RES" does not meet the threshold for any predefined object identifier, the HOS 302 may leave it unmapped for subsequent processing in a later stage. The matching undefined objects 306 and the predefined data objects 370 are bolded to highlight similarities that the similarity model identifiers. In some examples, the updated objects 308 may be provided to the computer system 301 that provided the undefined objects 306 initially. The first updated list 310 may be provided to a second stage for analysis by a production generative model as discussed in more detail with respect to FIG. 4.

Figure 4:
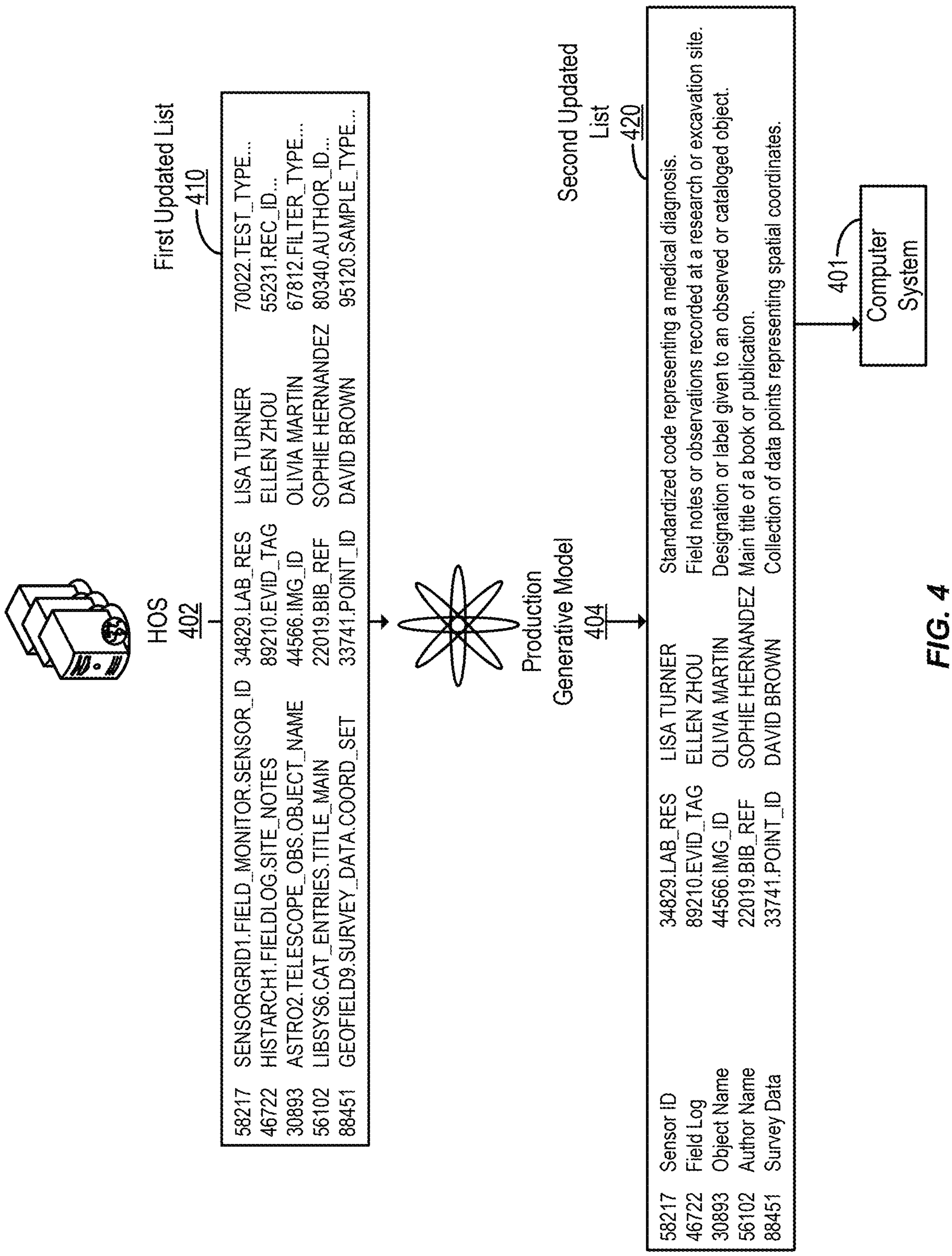
FIG. 4 is a simplified diagram of example second stage of a method for staged undefined object heterogeneity optimization using a production generative model, according to certain embodiments.

FIG. 4 is a simplified diagram of example second stage of a method for staged undefined object heterogeneity optimization using a production generative model 404, according to certain embodiments. Continuing from FIG. 3, a HOS 402 may provide a first updated list 410 (which is an example of the first updated list 310 with respect to FIG. 3) to a production generative model 404 for analysis. By way of a non-limiting example, a HOS 402 may provide the first updated list 410, derived from the initial aggregation of undefined objects that have not been matched to predefined object identifiers, to the production generative model 404 for further analysis. The first updated list 410 may include data entries received from a variety of disparate computer systems, including fields with heterogeneous and system-specific naming conventions. For instance, the list may contain records with object identifiers such as diagnosis codes, log descriptions, object names, author names, and survey data, each originally labeled in a format unique to its source platform. The HOS 402 compiles these remaining undefined objects and determines the appropriate input for the production generative model 404, which is trained on a set of ground truth training examples partitioned according to a defined data structure based on standardized object identifiers (or the predefined object identifiers and/or definitions).

Upon receiving the input, the production generative model 404 may analyze each remaining undefined object in the first updated list 410, applying contextual inference, semantic mapping, and/or reference to predefined object identifiers and/or definitions (e.g., lookup tables). The production generative model 404 may output a second updated list 420 in which undefined object identifiers are overwritten with standardized, plain English object identifiers and associated definitions. For example, computer system-specific fields such as those denoting sensor codes or log descriptions are replaced with terms like "Sensor Code" or "Field Log" each accompanied by a concise, universally interpretable definition. In various embodiments, the HOS 402 may further instruct (or cause) each respective disparate computer system 401 to update its local memory by overwriting the remaining undefined objects with post-defined objects generated by the production generative model 404. Additionally, the HOS 402 may respond to requests from edge devices by generating and distributing context files, or displaying subsets of the updated data through an application programmable interface (API) and/or graphical user interface (GUI), customized to the specific context or operational needs of the computer system and/or edge device.

In a non-limiting example, following the initial stage, certain entries remain ambiguous or unmatched. The HOS 402 addresses these by clustering the undefined objects into similarity groups based on a categorization score. A first category list includes objects that closely match known standards in the look-up table (e.g., entries with minor typographical differences or abbreviations). A second category list contains entries with low similarity scores or unique formatting (e.g., "MOISTURE_READING," "PLOT_TAG"), which are provided to the production generative model 404 for further analysis and definition. Clustering may help reduce computational resources spent by the production generative model 404. To support distributed, context-sensitive access, the HOS 402 enables interaction with edge devices associated with the computer systems. When the edge device (e.g., a user terminal, a mobile application, and/or a field gateway) requests defined objects associated with a particular operational context, the HOS 402 (or production generative model 404) may generate a context file based on the first updated list 410 and/or second updated list 420. This file contains, for each relevant object, a plain English term and definition (e.g., "Field Log" with "Field notes or observations recorded at a research or excavation site"). The context file is then transmitted to the edge device for immediate use. In addition, or alternatively, the edge device may access a subset of standardized objects via an application programming interface (API), displaying only those objects and definitions pertinent to the current context.

Figure 5:
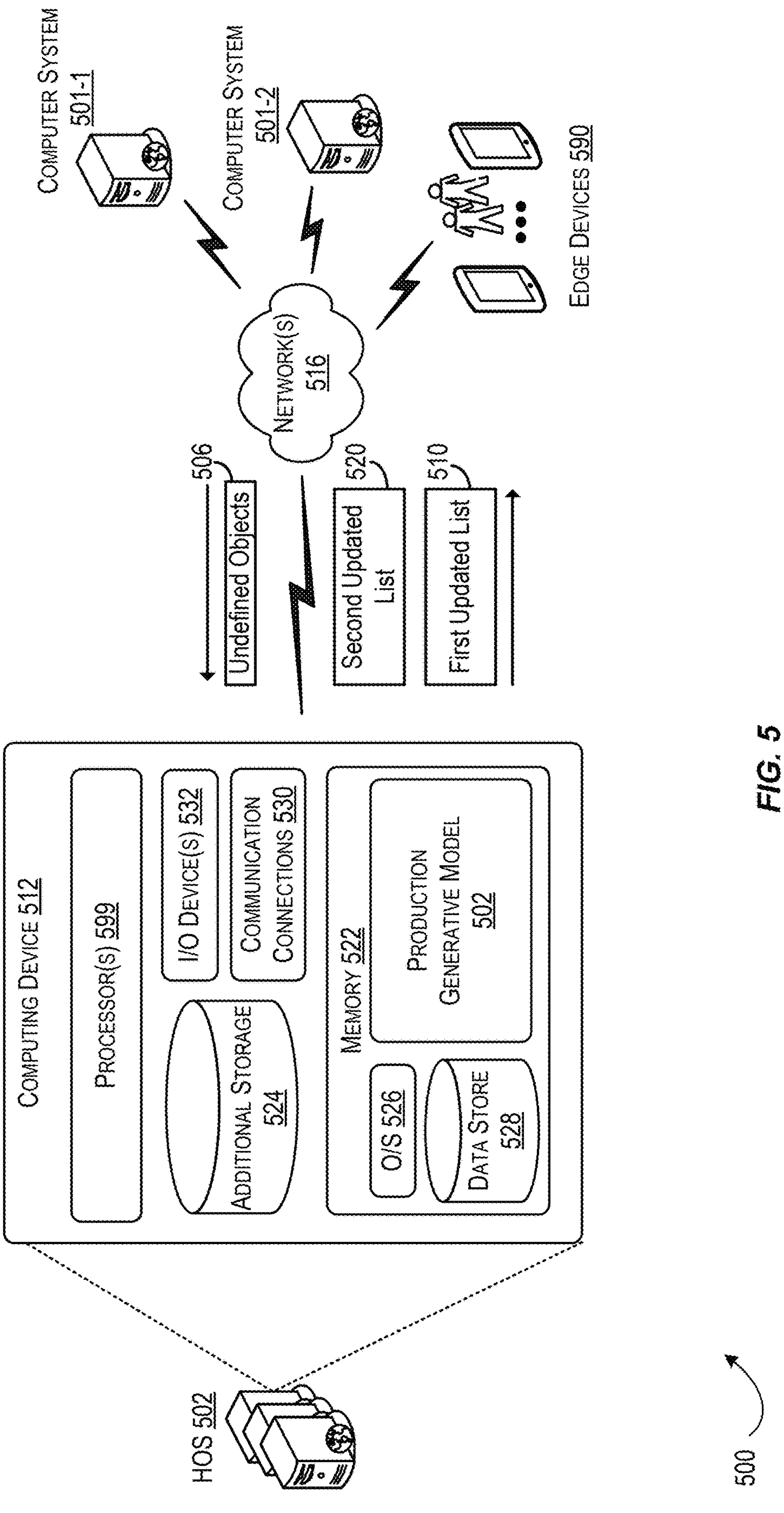
FIG. 5 is a simplified diagram of example network of computer systems, according to certain embodiments.

FIG. 5 is a simplified diagram of example network of computer systems, according to certain embodiments. A computing device 512 may host (or otherwise run) a HOS 502, which is an example of HOS 102, with respect to FIG. 1. The system 500 may be configured to define undefined objects from disparate computer systems 501 and/or edge devices 590. In some embodiments, computer systems 501, and/or one or more edge device(s) 590 (e.g., client devices) may communicate with a computing device 512 over one or more network(s) 516. Network(s) 516 may include any suitable combination of different types of networks, such as cable networks, the Internet, wireless networks, cellular networks, and other private and/or public networks.

In some embodiments, the computing device 512 may include one or more processors (e.g., processors 599). The processors 599 may be implemented in hardware, computer-executable instructions, firmware, or combinations thereof. Computer-executable instruction or firmware implementations of the processors 599 may include computer-executable or machine-executable instructions written in any suitable programming language. Computing device 518 may include memory 522. The memory 522 may store computer-executable instructions that are loadable and executable by the processors 599, as well as data generated during the execution of these programs. The memory 522 may be volatile (such as RAM) and/or non-volatile (such as ROM, flash memory, etc.). The computing device 512 may include additional storage (e.g., storage 524), which may include removable storage and/or non-removable storage. Storage 524 may include, but is not limited to, magnetic storage, optical disks and/or tape storage. The disk drives and their associated computer-readable media may provide non-volatile storage of computer-readable instructions, data structures, program components, and other data for the computing devices.

The memory 522 and/or storage 524 may be examples of non-transitory computer-readable storage media. Computer-readable storage media may include volatile, non-volatile, removable, or non-removable media implemented in any method or technology for storage of information, such as computer-readable instructions, data structures, program components, or other data. Memory 522 and/or additional storage 524 may include, but are not limited to, any suitable combination of PRAM, SRAM, DRAM, RAM, ROM, EEPROM, flash memory or other memory technology, CD-ROM, DVD, magnetic tape, magnetic disk storage or other magnetic storage devices, or any other medium which can be used to store desired information, and which can be accessed by the computing device 512. Computer-readable media may include computer-readable instructions, program components, or other data transmitted within a data signal, such as a carrier wave or other transmission. However, as used herein, computer-readable storage media does not include computer-readable communication media. The memory 522 may include an operating system 526, one or more data stores 528, and/or one or more application programs, components, or services. The computing device may also contain communications connection(s) 530 that allow the computing device 512 to communicate with a stored database, another computing device, a server, user terminals, and/or other devices (e.g., via one or more networks, not depicted). The computing device may include I/O device(s) 532, such as a keyboard, a mouse, a stylus, a voice input device, a touch input device, a display, speakers, a printer, etc. In some embodiments, the memory 522 may store instructions that, when executed by processors 599, implement the functionality described herein, with respect to the HOS 502 (e.g., HOS 102 of FIG. 1).

In operation, and as discussed with respect to FIGS. 1-4, the HOS 502, hosted on computing device 512, is configured to receive undefined objects 506 originating from a plurality of disparate computer systems 501 and/or edge devices 590. These undefined objects 506 may be delivered over various types of networks 516 (e.g., Internet, wireless, cellular, cable), and may be aggregated as part of scheduled data transfers, real-time streams, or ad hoc requests. The undefined objects 506 comprise data entries that lack standardized identifiers or definitions and may be formatted according to the conventions of their source systems. For example, one computer system 501-1 may transmit object identifiers formatted as "SENSORGRID1.FIELD_MONITOR.SENSOR_ID," while computer system 501-2 may use "HISTARCH1.FIELDLOG.SITE_NOTES," each computer system 501 providing data with differing structure, length, and/or semantic clarity.

Upon receiving the undefined objects 506, the HOS 502 aggregates these entries into an ordered list for processing. The processors 599 and memory 522 of the HOS 502 applies similarity scoring and comparison logic to identify matches between undefined objects 506 and a set of standardized, predefined object identifiers stored in one or more data stores 528 in a first stage which has a minimal memory and processor power footprint. This results in the generation of a first updated list 510, which includes objects that have been mapped and/or overwritten with standardized terms and definitions. In embodiments where certain objects remain ambiguous or unmapped after initial normalization, the HOS 502 may proceed to a second stage using the production generative model 502 to analyze the remaining entries. This production generative model 502, trained on ground truth training examples and structured data partitions, further infers standardized object identifiers and definitions for each remaining undefined object, producing a second updated list 520 that contains, at least in part, plain English terms and definitions for every remaining previously undefined entry.

The HOS 502 may coordinate data updates across the networked computer systems 501. For example, when the first updated list 510 and/or second updated list 520 are generated, the HOS 502 can transmit instructions or payloads to the respective computer systems 501 over communications connection(s) 530. In various embodiments, the first updated list 510 has a lower memory footprint than a list containing the undefined objects 506, and the second updated list 520 has a lower memory footprint relative to the first updated list 510. These instructions cause each computer system 501 to overwrite stored undefined objects with their standardized counterparts, as defined in the updated lists. This overwrite operation may occur as a batch process, transactionally, by request, or in real time, depending on network capabilities and system needs. For example, a field sensor array may receive a message instructing it to replace "SENSORGRID1.FIELD_MONITOR.SENSOR_ID" with "Sensor ID" while a field research platform may update "HISTARCH1.FIELDLOG.SITE_NOTES" to "Field Log". In addition, or alternatively, the HOS 502 may support context-aware data distribution and user interaction. Upon request from an edge device 590 (e.g., client terminal, mobile gateway), the HOS 502 can generate and transmit a context file containing standardized terms and definitions from the first updated list 510 and/or second updated list 520. This file may be unique to the context of the request, enabling edge devices 590 to display, via API and/or GUI, a subset of objects relevant to the operational scenario. For example, a field device may request only location-related objects, receiving "Location Description" and its definition for display or downstream processing.

Figure 6:
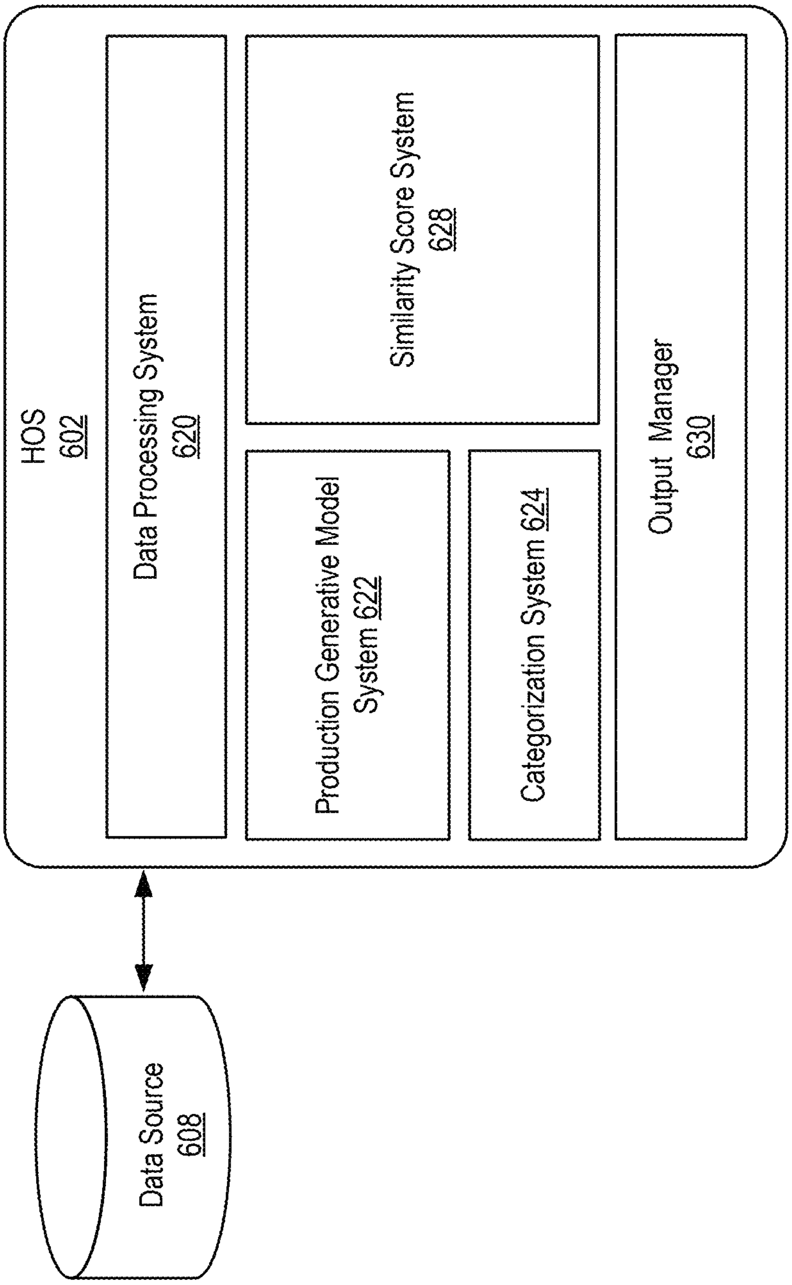
FIG. 6 is a simplified diagram of example computer architecture, according to certain embodiments.

FIG. 6 is a simplified diagram of example computer architecture, according to certain embodiments. By way of a non-limiting example, a HOS 602, which is an example of the HOS 102 and HOS 502, may include various components to facilitate defining undefined objects and subsequent operations. By way of a non-limiting example, Thae data processing system 620 may include one or more processors, memory modules, and associated hardware, firmware, or software configured to aggregate, store, and manipulate raw, structured, or partially structured data entries received from disparate computer systems or edge devices. In some embodiments, the data processing system 620 may be implemented as a distributed computing cluster, a cloud-based data environment, a virtualized server environment, and/or an on-premises enterprise server. The data processing system 620 may facilitate bulk ingestion of files in a variety of formats (e.g., CSV, JSON, XML, Parquet, TXT), perform preliminary data cleansing (e.g., removing duplicates, correcting encoding errors, handling missing values), and maintain tracking for each object. The HOS 602 may also implement transactional logging, access control, and data encryption to support secure and auditable processing workflows. For example, the data processing system 620 may receive a batch of raw sensor logs from an IoT network, combine them with laboratory records from a research facility, and format the resulting entries into a unified dataset for downstream normalization.

The HOS 602 may include access to a production generative model system 622 may that may include any suitable artificial intelligence or machine learning platform capable of analyzing and transforming unresolved or ambiguous data objects into standardized, interpretable formats. In exemplary embodiments, the generative model system 622 may utilize large language models (LLMs) such as GPT-4, PaLM, Llama, or BERT, or may use domain-specific neural networks, transformer architectures, and/or ensemble models trained on ground truth datasets. The production generative model system 622 may be implemented using cloud-based AI platforms, dedicated GPU clusters, or containerized microservices. The production generative model system 622 may be configured to accept structured prompts, context files, and/or feature vectors representing ambiguous data objects, and to output plain English object identifiers and definitions based on semantic inference, context matching, and/or historical mappings (e.g., from data source 608). For instance, the production generative model system 622 may analyze the entry "LAB_RES" in the context of laboratory data and infer that it corresponds to "Test Type," providing both a standardized term and an associated definition. The production generative model system 622 may support batch processing, real-time inference, and/or continual learning to adapt to evolving data and new object types.

A similarity score system 628 may quantitatively evaluate a degree of correspondence between undefined object identifiers and a set of predefined object identifiers stored in a data source. For example,

TABLE 1

Example Similarity Score Matching

| Undefined Object Identifier | Predefined Object Identifier | Score | Result |
|---|---|---|---|
| SENSORGRID1.FIELD_MONITOR.SENSOR_ID | Sensor ID | 0.94 | Match |
| ARCHIVE3.DOC_METADATA.AUTHOR_NAME | Author Name | 0.99 | Match |
| OBS_DATA5.ENV_SENSOR.LOCATION_DESC | Location Description | 0.92 | Match |
| AGTRIAL7.PLOT_ACTIVITY.TEMP_GROUP | Temperature | 0.90 | Match |
| AGTRIAL7.PLOT_ACTIVITY.SEASON_GROUP | Growth Season | 0.88 | Match |
| ASTRO2.TELESCOPE_OBS.OBJECT_NAME | Object Name | 0.98 | Match |
| ASTRO2.TELESCOPE_OBS.OBJECT_NAME | Book Title | 0.85 | Match |
| ENVIRO2.WEATHER_STATION.OBJECT_NAME | Field Label | 0.91 | Match |
| 14201.CELL_XYZ | Sample ID | 0.40 | No Match |
| 34829.LAB_RES | Test Type | 0.45 | No Match |

The HOS 602 may employ a variety of algorithmic approaches, including string distance metrics (e.g., Levenshtein distance, Jaccard similarity, Cosine similarity), semantic similarity models (e.g., word embeddings using Word2Vec, GloVe, or FastText), and contextual vector analysis (e.g., using Sentence Transformers or semantic hashing). In some embodiments, the similarity score system 628 may implement hybrid models that combine lexical matching with domain-specific ontologies or taxonomies. For example, the system may compare "ENV_SENSOR.LOCATION_DESC" to "Location Description" calculating a similarity score based on both character overlap and semantic proximity. Scores may be normalized to a scale (e.g., 0 to 1) and compared against a configurable threshold to determine whether a match is sufficiently strong for normalization. The similarity score system 628 may operate in batch or streaming modes, and may log scoring results for auditing and optimization purposes.

A categorization system 624 may organize undefined data objects into logical groups based on similarity metrics, context, or operational needs. The categorization system 624 may employ clustering algorithms such as k-means, DBSCAN, agglomerative hierarchical clustering, or spectral clustering, as well as classification models using supervised or unsupervised learning. Categorization may be based on scoring outputs from the similarity score system 628, metadata attributes, or external contextual information. For example, objects with high similarity scores to known standards may be clustered into a "direct mapping" group, while objects with low scores or novel formats may be assigned to a "requires inference" group for further processing by the production generative model system 622. The categorization system 624 may support dynamic category creation, rule-based assignments, and integration with domain-specific ontologies to facilitate flexible grouping and prioritization. Clusters may be visualized via GUI, API, dashboards, exported for reporting, or used to optimize computational resource allocation.

An output manager 630 may handle the dissemination, visualization, and/or operational control of updated data objects following normalization and inference. The output manager 630 may include GUIs for human operators, dashboards for system administrators/developers/technicians, and/or APIs for automated or remote device interactions. In some embodiments, the output manager 630 may control edge devices (e.g., edge devices 590 with respect to FIG. 5), user terminals, or remote systems (e.g., computer systems 501 with respect to FIG. 5) to overwrite local copies of undefined objects with their standardized counterparts, either transactionally, in bulk, or by request. The output manager 630 may generate context files containing plain English terms and definitions, distribute them over secure channels, and log delivery status for compliance purposes. Display functions may include searchable tables, interactive filters, and export options (e.g., PDF, Excel, JSON), while APIs may expose endpoints for real-time queries, batch updates, and/or integration with third-party platforms. For example, upon request from an edge device, the output manager 630 may transmit a context file containing standardized location descriptions and update the device's local database to ensure consistency with the HOS 602.

The data source 608 may be implemented as a pre-defined look-up table containing a comprehensive set of standardized predefined object identifiers and associated definitions. The data source may reside in a relational database, a SQL store, a cloud-native data catalog, and/or an in-memory key-value store, and may be accessed via direct queries, APIs, and/or data streaming mechanisms. The look-up table may be curated from regulatory standards, organizational taxonomies, historical mapping records, or domain-specific ontologies. For example, the data source may include entries such as ("Sample ID," "Unique identification number for a sample in an experiment or study"), ("Type Code," "Standardized code representing a type of operation"), ("Survey Data," "Collection of data points representing spatial coordinates"), along with metadata such as synonyms, abbreviations, language translations, and version history. The data source 608 serves as the authoritative reference for normalization, similarity scoring, and context file generation throughout the system.

Figure 7:
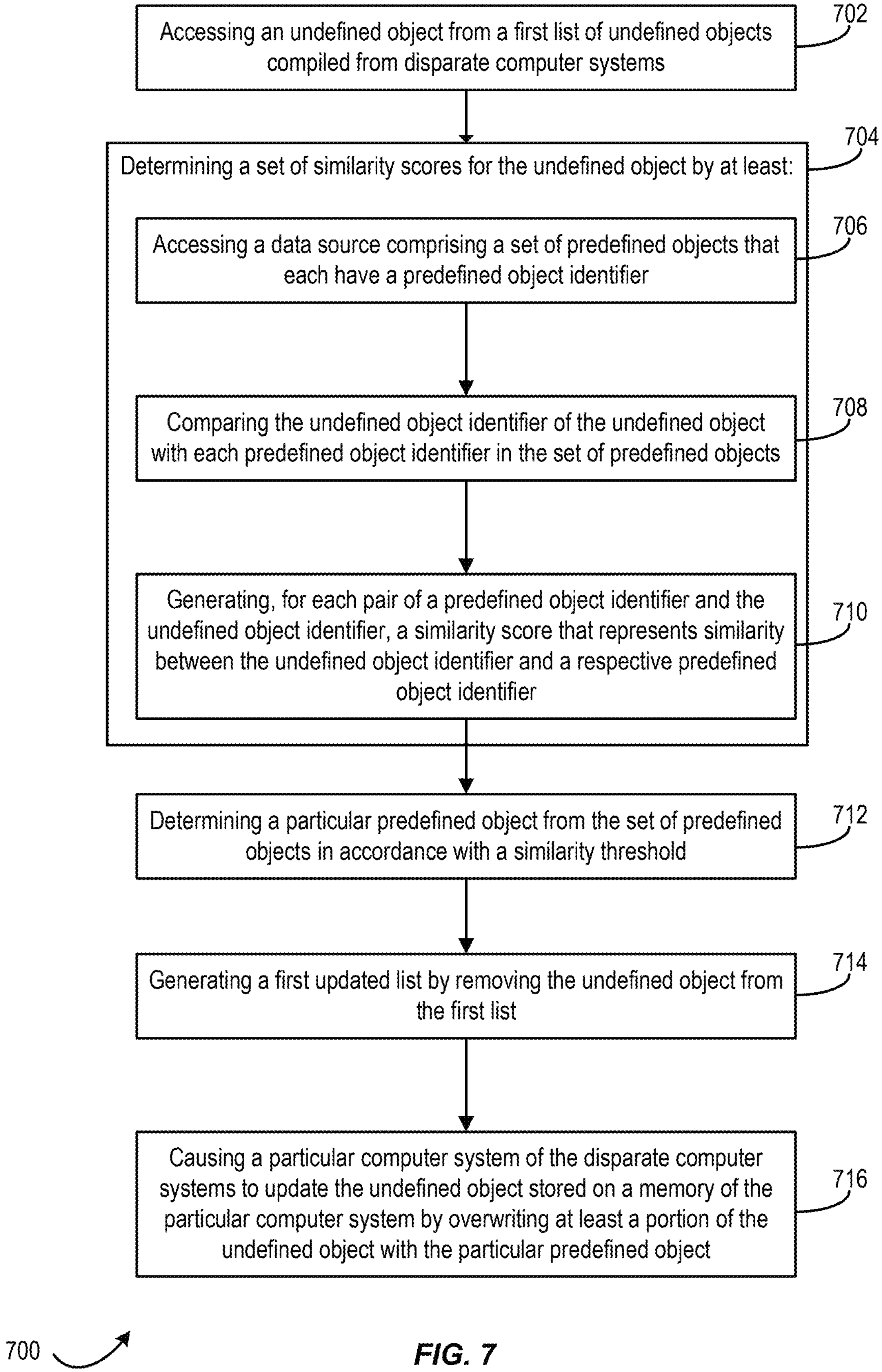
FIG. 7 is a simplified diagram of an example method for staged undefined object heterogeneity optimization, according to certain embodiments.

FIG. 7 is a simplified diagram of an example method 700 for staged undefined object heterogeneity optimization, according to certain embodiments.

At 702, the method 700 includes accessing an undefined object from a first list of undefined objects compiled from disparate computer systems. For example, a HOS (e.g., HOS 102 with respect to FIG. 1) may receive a list of undefined objects (e.g., undefined object 206 with respect to FIG. 2) from a variety of sources, such as legacy databases, cloud storage platforms, laboratory management systems, archival repositories, or field data collection devices (e.g., computer systems 501 with respect to FIG. 5). Each undefined object may be identified by an undefined object identifier, such as "SENSORGRID1.FIELD_MONITOR.SENSOR_ID," "AGRODATA2.CROP_TREATMENT_CODE," "AGARCHIVE3.FIELD_METADATA._OPERATOR_NAME." The method 700 may include accessing one or more undefined objects, either by direct query, batch retrieval, or automated ingestion of files transmitted over a network (e.g., network 516 with respect to FIG. 5).

At 704, the method 700 includes determining a set of similarity scores for the undefined object by performing one or more of steps 706-710. For example, at 706, the method 700 includes accessing a data source comprising a set of predefined data objects that each have a predefined object identifier. By way of a non-limiting example, the data source may be a pre-defined look-up table stored in a relational database, an in-memory key-value store, or a cloud-native data catalog. This look-up table may contain standardized object identifiers such as "Sample ID," "Diagnosis Code," "Author Name," "Location Description," "Object Name," and "Survey Data," each accompanied by a plain English definition (e.g., "Unique identification number for a sample in an experiment or study," "Standardized code representing a medical diagnosis," "Name of the individual who created or contributed to a record"). The HOS may access this look-up table via database queries, API calls, or direct file reads.

At 708, the method 700 includes comparing the undefined object identifier of the undefined object with each predefined object identifier in the set of predefined data objects. By way of a non-limiting example, a similarity score may be used to perform comparisons between the undefined object identifiers and each predefined object identifiers in the look-up table. This may be accomplished using string distance metrics (e.g., Levenshtein distance, Jaccard similarity), semantic similarity models (e.g., word embeddings, contextual inference using transformer-based models), or a combination of these approaches. For instance, the HOS may compare "AGARCHIVE3.FIELD_METADATA._OPERATOR_NAME" to "Operator Name" evaluating both character overlap and semantic context. Each comparison results in a set of similarity scores, which are recorded for further analysis.

At 710, the method 700 includes generating, for each pair of a predefined object identifier and the undefined object identifier, a similarity score that represents similarity between the undefined object identifier and a respective predefined object identifier. By way of a non-limiting example, similarity scores may be calculated as normalized values between zero and one, reflecting the degree of match. For example, "SENSORGRID1.FIELD_MONITOR.SENSOR_ID" and "Sample ID" may yield a similarity score of 0.95, while "SENSORGRID1.FIELD_MONITOR._SENSOR_ID" and "Survey Data" may yield a score of 0.30. The HOS may maintain a log of these scores to facilitate threshold-based decision making, error handling, and ongoing optimization.

At 712, the method 700 includes determining a particular predefined object from the set of predefined data objects in accordance with a similarity threshold. By way of a non-limiting example, the HOS may establish a similarity threshold (e.g., 0.85). For each undefined object, the HOS selects the predefined object identifier with the highest similarity score that meets or exceeds this threshold. For instance, "SENSORGRID1.FIELD_MONITOR.SENSOR_ID" may be mapped to "Sample ID" if the score is sufficiently high, while ambiguous undefined objects with lower scores may be set aside for additional processing including, but not limited to, categorization or production generative model analysis.

At 714, the method 700 includes generating a first updated list by removing the undefined object from the first list. By way of a non-limiting example, once an undefined object is matched to a predefined object identifier, the original undefined object is removed from the first list and replaced in the first updated list with the standardized term and (optionally) its definition. This updated list now contains only those entries that have been successfully normalized that results in a more memory-efficient and interpretable dataset with verbose or system-specific identifiers replaced by concise standardized terms.

At 716, the method 700 includes causing a particular computer system of the disparate computer systems to update the undefined object stored on a memory of the particular computer system by overwriting at least a portion of the undefined object with the particular predefined object. By way of a non-limiting example, the HOS may transmit an update instruction to the disparate computer systems or edge devices, enabling the HOS to overwrite the stored undefined object with the standardized object identifier and definition. This update may be performed as a batch operation, a real-time transaction, and/or as part of a scheduled synchronization process. For example, laboratory database may receive an instruction to replace "GEN_SEQUENCER.SAMPLE_ID" with "Sample ID," while a survey repository may update "SURVEY_DATA.COORD_SET" to "Survey Data." The overwrite process ensures consistency and standardization across all networked systems, reduces memory usage, and may improve downstream data accessibility.

By way of a non-limiting example, in financial institutions, aggregation of data for regulatory reporting, risk management, and audit frequently involves compiling millions of entries from disparate systems, (e.g., core banking platforms, investment management systems, and external data feeds). These systems often store critical data elements (CDEs) under proprietary, non-standardized labels, resulting in undefined objects that lack clear, industry-compliant definitions. For example, customer account numbers may appear as "ACC_NUM_2024" in one platform, "CLIENT_NUMBER" in another, and "CUST_ID" in yet a third. Transaction amounts might be stored under fields like "TXN_AMT," "AMOUNT," or "BOOKING_VALUE," while risk ratings could be labeled as "RISK_GRADE," "CREDIT_SCORE," or "EXPOSURE RATING." This heterogeneity creates significant challenges for financial reporting, as regulatory frameworks such as Basel III, Dodd-Frank, and SEC rules require accurate, standardized CDEs (e.g., "Account Number," "Transaction Amount," "Risk Rating") with universally recognized definitions.

In this example, undefined financial data objects (e.g., undefined objects) may be transformed into standardized CDEs using a staged optimization process. Upon ingesting raw financial data from multiple systems, the method 700 may apply a similarity score system to compare each undefined object identifier against a pre-defined look-up table of CDEs and their regulatory definitions. For instance, an entry labeled "TXN_AMT" is compared against "Transaction Amount," and, if the similarity score meets a threshold, is replaced with the standardized term and its definition: "Transaction Amount: The monetary value of a financial transaction as recorded in the general ledger." Similarly, "CLIENT_NUMBER" is mapped to "Account Number: A unique identifier assigned to a customer's account for reporting and audit purposes." Other examples include mapping "EXPOSURE_RATING" to "Risk Rating: An assessment of the credit risk associated with a counterparty or financial instrument," or "BOOKING_DATE" to "Transaction Date: The calendar date on which a transaction was finalized."

Continuing this example, undefined financial objects that cannot be directly matched (e.g., custom fields introduced by regional branches or third-party vendors), the method 700 proceeds to a second stage leveraging a production generative model trained on ground truth financial data and industry taxonomies. The production generative model infers the most likely standardized CDE for entries such as "FX_AMT" (mapped to "Foreign Exchange Amount: The value of a currency trade"), "LEI_CODE" (mapped to "Legal Entity Identifier: A unique code used to identify legal entities in financial transactions"), or "INT_RATE" (mapped to "Interest Rate: The percentage rate charged or paid for the use of money"). Once defined, the HOS causes the respective financial systems to overwrite these entries with the standardized CDEs and their definitions, ensuring that all data is compliant and memory-efficient. Furthermore, edge devices or reporting terminals can request context-specific files, receiving only the relevant CDEs and definitions for tasks such as stress testing, audit sampling, or regulatory submission.

In various embodiments, a control operations may be implemented within finance networks and/or HOS systems. For example, upon receipt of standardized CDEs, such as "Account Number," "User Identifier," "Risk Rating," and "Account Status," a device or associated management server may be controlled to dynamically update the graphical user interface (GUI) of an account dashboard, presenting users with real-time, clearly labeled account information and regulatory status indicators. Such GUI updates may include activating or disabling interface controls, for instance enabling a "Withdraw" button only if the "Account Status" is "Active," displaying alerts if the "Risk Rating" exceeds a threshold, or reorganizing account summaries based on standardized categories.

In another embodiment, the HOS may utilize the standardized data to control account status and permissions. For example, if a user's account is controlled to receive an updated "Risk Rating" indicating suspicious activity or non-compliance, the HOS may automatically pause or freeze all current and future transactions associated with that account, by toggling an "Account Freeze" state based on the standardized "Account Status" field. The HOS may also trigger multi-factor authentication or notify compliance officers.

In another embodiment, the initiation of targeted monitoring for sets of users or accounts that meet certain criteria derived from the standardized CDEs. For example, if a group of accounts is identified with high transaction volumes, elevated "Risk Ratings," or recent anomalous "Transaction Amount" patterns, the finance device or supervisory server may automatically launch a real-time monitoring protocol. This protocol may include increased logging, flagging of specific transactions for audit, or the initiation of automated anomaly detection algorithms. Each control action by the HOS may be based at least in part on the standardized data objects.

In various embodiments, the HOS may control a device, such as a transaction terminal, automated teller machine (ATM), point-of-sale (POS) system, ACH batch system, and/or remote payment gateway. Upon completion of the overwrite process and receipt of a context-specific file containing relevant CDEs (e.g., "Account Number," "Transaction Amount," "Transaction Date"), the HOS may execute a transaction protocol based on the standardized data. For example, a payment terminal (e.g., gas station) may receive a file containing "Account Number: 002-945-6731," "Transaction Amount: $150.00," and "Transaction Date: 2024 Jul. 4." The terminal parses the standardized entries, performs necessary validation checks (e.g., verifying account status, confirming transaction limits, checking fraud indicators), and, upon successful validation, initiates the transfer of funds from the source account to the designated recipient account. In another example, an ATM may utilize a standardized "Risk Rating" to determine transaction approval thresholds, dynamically authorizing or restricting cash withdrawal amounts based on real-time risk assessments.

The various embodiments can be further implemented in a variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems, and other devices capable of communicating via a network.

Most embodiments utilize at least one network that would be familiar to those skilled in the art for supporting communications using any of a variety of commercially available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) may also be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices will also typically include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile storage, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed. On the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order, unless otherwise indicated herein or otherwise clearly contradicted by context. The use of any and all examples or exemplary language (e.g., "such as") provided herein is intended merely to better illuminate embodiments of the disclosure and does not pose a limitation on the scope of the disclosure unless otherwise claimed. No language in the specification should be construed as indicating any non-claimed element as essential to the practice of the disclosure.

Where terms are used without explicit definition as recited herein, it is understood that the ordinary meaning of the word is intended, unless a term carries a special meaning in the field of anomaly detection or other relevant fields. The terms "about," "substantially", "similar to", "similar", or "approximately" are used to indicate a deviation from the stated property or numerical value within which the deviation has little to no influence of the corresponding function, property, or attribute of the structure being described. In an illustrated example, where a dimensional parameter is described as "substantially equal" to another dimensional parameter, the term "substantially" is intended to reflect that the two dimensions being compared can be unequal within a tolerable limit, such as a fabrication tolerance. In the present disclosure, "ranges" refers to a range of values between the two stated extents and/or including one of the two stated extents.

Disjunctive language such as the phrase "at least one of X, Y, or Z," unless specifically stated otherwise, is intended to be understood within the context as used in general to present that an item, term, etc., may be either X, Y, or Z, or any combination thereof (i.e., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for staged undefined object heterogeneity optimization, the computer-implemented method comprising:

accessing an undefined financial data object from a first list of undefined financial data objects compiled from disparate computer systems, wherein the undefined financial data object is identified by an undefined financial data object identifier;

determining a set of similarity scores for the undefined financial data object by at least:

accessing a data source comprising a set of predefined data objects that each have a predefined object identifier;

comparing the undefined financial data object identifier of the undefined financial data object with each predefined object identifier in the set of predefined data objects; and generating, for each pair of a predefined object identifier and the undefined financial data object identifier, a similarity score that represents similarity between the undefined financial data object identifier and a respective predefined object identifier;

determining a particular predefined object from the set of predefined data objects in accordance with a similarity threshold and the set of similarity scores;

generating a first updated list by removing the undefined financial data object from the first list;

causing a particular computer system of the disparate computer systems to update the undefined financial data object stored on a memory of the particular computer system by overwriting at least a portion of the undefined financial data object with the particular predefined object in accordance with the first updated list, wherein the particular predefined object has a lower memory foot print compared to the undefined financial data object;

determining an account associated with a transactions volume based at least in part on the particular predefined object;

generating a risk rating associated with the account based at least in part on the transaction volume, wherein the risk rating represents a suspicious activity or a non-compliance associated with the account; and performing at least one of:

causing a payment terminal to authorize a financial asset withdrawal associated with the account based at least in part on the risk rating;

causing the payment terminal to restrict the financial asset withdrawal associated with the account based at least in part on the risk rating; or causing the particular computer system to initiate an account freeze on the account to freeze future attempted transactions based at least in part on the risk rating.

2. The computer-implemented method of claim 1, further comprising:

determining an input for a production generative model by compiling remaining undefined financial data objects of the first updated list, wherein the production generative model is based at least in part on a set of ground truth training examples and a selected data structure that partitions the set of ground truth training examples into a defined data structure based at least in part on the set of predefined data objects, and wherein the first updated list has a lower memory footprint that the first list;

providing the input in a prompt to the production generative model;

receiving, as output from the production generative model, a post-defined financial data object for each remaining undefined financial data object of the remaining undefined financial data objects in the first updated list; and generating a second updated list by overwriting each remaining undefined object in the first updated list, wherein the second updated list has a reduced memory footprint compared to the first updated list.

3. The computer-implemented method of claim 2, further comprising:

causing each respective disparate computer system of the disparate computer systems associated with the remaining undefined financial data objects to update the remaining undefined financial data objects stored on respective memories of each respective disparate computer system, respectively, by overwriting the remaining undefined financial data objects with the post-defined financial data object, wherein the post-defined financial data object has a lower memory footprint than the remaining undefined financial data objects.

4. The computer-implemented method of claim 2, wherein the data source is a pre-defined look-up table.

5. The computer-implemented method of claim 2, further comprising:

receiving, from an edge device associated with a computer system of the disparate computer systems, a request for defined financial data objects associated with a context;

generating a context file based at least in part on the first updated list, the second updated list, or both, that comprises a plain English term for each undefined financial data object, each of the remaining undefined financial data objects, or both associated with the context, a plain English definition for each undefined financial data object, each remaining undefined financial data object, or both, associated with the context; and causing the context file to be distributed to the edge device.

6. The computer-implemented method of claim 2, further comprising:

receiving, from an edge device associated with a computer system of the disparate computer systems, a request for defined financial data objects associated with a context; and causing the edge device to display, using an application programmable interface (API), a subset of financial data objects of the first updated list, the second updated list, or both based at least in part on the context, wherein the subset of financial data objects are associated with the defined financial data objects.

7. The computer-implemented method of claim 2, further comprising:

clustering the undefined financial data objects into similarity groups based at least in part on a categorization score, wherein the first list includes a first category list and a second category list, wherein undefined financial data objects that occur in the first category list are not provided to the production generative model and undefined financial data objects that occur in the second category list are provided to the production generative model.

8. A computing device, comprising:

one or more processors; and one or more memories storing computer-executable instructions that, when executed by the one or more processors, causes the one or more processors to:

access an undefined financial data object from a first list of undefined financial data objects compiled from disparate computer systems, wherein the undefined financial data object is identified by an undefined financial data object identifier;

determine a set of similarity scores for the undefined financial data object by at least:

accessing a data source comprising a set of predefined data objects that each have a predefined object identifier;

comparing the undefined financial data object identifier of the undefined financial data object with each predefined object identifier in the set of predefined data objects; and generating, for each pair of a predefined object identifier and the undefined financial data object identifier, a similarity score that represents similarity between the undefined financial data object identifier and a respective predefined object identifier;

determine a particular predefined object from the set of predefined data objects in accordance with a similarity threshold and the set of similarity scores;

generate a first updated list by removing the undefined financial data object from the first list; and cause a particular computer system of the disparate computer systems to update the undefined financial data object stored on a memory of the particular computer system by overwriting the undefined financial data object with the particular predefined object in accordance with the first updated list, wherein the particular predefined object has a lower memory foot print compared to the undefined financial data object;

determine an account associated with a transactions volume based at least in part on the particular predefined object;

generate a risk rating associated with the account based at least in part on the transaction volume, wherein the risk rating represents a suspicious activity or a non-compliance associated with the account; and perform at least one of:

cause a payment terminal to authorize a financial asset withdrawal associated with the account based at least in part on the risk rating;

cause the payment terminal to restrict the financial asset withdrawal associated with the account based at least in part on the risk rating; or cause the particular computer system to initiate an account freeze on the account to freeze future attempted transactions based at least in part on the risk rating.

9. The computing device of claim 8, wherein the instructions further cause the processor to:

determine an input for a production generative model by compiling remaining undefined financial data objects of the first updated list, wherein the production generative model is based at least in part on a set of ground truth training examples and a selected data structure that partitions the set of ground truth training examples into a defined data structure based at least in part on the set of predefined data objects, and wherein the first updated list has a lower memory footprint that the first list;

provide the input in a prompt to the production generative model;

receive, as output from the production generative model, a post-defined financial data object for each remaining undefined financial data object in the updated list; and generate a second updated list by overwriting each remaining undefined financial data object of the remaining undefined financial data objects in the first updated list, wherein the second updated list has a reduced memory footprint compared to the first updated list.

10. The computing device of claim 9, wherein the instructions further cause the processor to:

cause each respective disparate computer system of the disparate computer systems associated with the remaining undefined financial data objects to update the remaining undefined financial data objects stored on respective memories of each respective disparate computer system, respectively, by overwriting the remaining undefined financial data objects with the post-defined financial data object, wherein the post-defined financial data object has a lower memory footprint than the remaining undefined financial data objects.

11. The computing device of claim 9, wherein the data source is a pre-defined look-up table.

12. The computing device of claim 9, wherein the instructions further cause the processor to:

receive, from an edge device associated with a computer system of the disparate computer systems, a request for defined financial data objects associated with a context;

generate a context file based at least in part on the first updated list, the second updated list, or both, that comprises a plain English term for each undefined financial data object, each of the remaining undefined financial data objects, or both associated with the context, a plain English definition for each undefined object, each remaining undefined financial data object, or both, associated with the context; and cause the context file to be distributed to the edge device.

13. The computing device of claim 9, wherein the instructions further cause the processor to:

receive, from an edge device associated with a computer system of the disparate computer systems, a request for defined financial data objects associated with a context; and cause the edge device to display, using an application programmable interface (API), a subset of financial data objects of the first updated list, the second updated list, or both based at least in part on the context, wherein the subset of financial data objects are associated with the defined financial data objects.

14. The computing device of claim 9, wherein the instructions further cause the processor to:

cluster the undefined financial data objects into similarity groups based at least in part on a categorization score, wherein the first list includes a first category list and a second category list, wherein undefined financial data objects that occur in the first category list are not provided to the production generative model and undefined financial data objects that occur in the second category list are provided to the production generative model.

15. A non-transitory computer-readable storage medium storing computer-executable instructions that, when executed with one or more processors of a computing device, causes the one or more processors to:

access an undefined financial data object from a first list of undefined financial data objects compiled from disparate computer systems, wherein the undefined financial data object is identified by an undefined financial data object identifier;

determine a set of similarity scores for the undefined financial data object by at least:

accessing a data source comprising a set of predefined data objects that each have a predefined object identifier;

comparing the undefined financial data object identifier of the undefined financial data object with each predefined object identifier in the set of predefined data objects; and generating, for each pair of a predefined object identifier and the undefined financial data object identifier, a similarity score that represents similarity between the undefined financial data object identifier and a respective predefined object identifier;

determine a particular predefined object from the set of predefined data objects in accordance with a similarity threshold and the set of similarity scores;

generate a first updated list by removing the undefined financial data object from the first list; and cause a particular computer system of the disparate computer systems to update the undefined financial data object stored on a memory of the particular computer system by overwriting the undefined financial data object with the particular predefined object in accordance with the first updated list, wherein the particular predefined object has a lower memory foot print compared to the undefined financial data object;

determine an account associated with a transactions volume based at least in part on the particular predefined object;

generate a risk rating associated with the account based at least in part on the transaction volume, wherein the risk rating represents a suspicious activity or a non-compliance associated with the account; and perform at least one of:

cause a payment terminal to authorize a financial asset withdrawal associated with the account based at least in part on the risk rating;

cause the payment terminal to restrict the financial asset withdrawal associated with the account based at least in part on the risk rating; or cause the particular computer system to initiate an account freeze on the account to freeze future attempted transactions based at least in part on the risk rating.

16. The non-transitory computer-readable storage medium of claim 15, wherein the instructions further cause the processor to:

determine an input for a production generative model by compiling remaining undefined financial data objects of the first updated list, wherein the production generative model is based at least in part on a set of ground truth training examples and a selected data structure that partitions the set of ground truth training examples into a defined data structure based at least in part on the set of predefined data objects, and wherein the first updated list has a lower memory footprint that the first list;

provide the input in a prompt to the production generative model;

receive, as output from the production generative model, a post-defined financial data object for each remaining undefined financial data object in the updated list; and generate a second updated list by overwriting each remaining undefined financial data object of the remaining undefined financial data objects in the first updated list, wherein the second updated list has a reduced memory footprint compared to the first updated list.

17. The non-transitory computer-readable storage medium of claim 16, wherein the instructions further cause the processor to:

cause each respective disparate computer system of the disparate computer systems associated with the remaining undefined financial data objects to update the remaining undefined financial data objects stored on respective memories of each respective disparate computer system, respectively, by overwriting the remaining undefined financial data objects with the post-defined financial data object, wherein the post-defined financial data object has a lower memory footprint than the remaining undefined financial data objects.

18. The non-transitory computer-readable storage medium of claim 16, wherein the instructions further cause the processor to:

receive, from an edge device associated with a computer system of the disparate computer systems, a request for defined financial data objects associated with a context;

generate a context file based at least in part on the first updated list, the second updated list, or both, that comprises a plain English term for each undefined financial data object, each of the remaining undefined financial data objects, or both associated with the context, a plain English definition for each undefined object, each remaining undefined financial data object, or both, associated with the context; and cause the context file to be distributed to the edge device.

19. The non-transitory computer-readable storage medium of claim 16, wherein the instructions further cause the processor to:

receive, from an edge device associated with a computer system of the disparate computer systems, a request for defined financial data objects associated with a context; and cause the edge device to display, using an application programmable interface (API), a subset of financial data objects of the first updated list, the second updated list, or both based at least in part on the context, wherein the subset of financial data objects are associated with the defined financial data objects.

20. The non-transitory computer-readable storage medium of claim 16, wherein the instructions further cause the processor to:

cluster the undefined financial data objects into similarity groups based at least in part on a categorization score, wherein the first list includes a first category list and a second category list, wherein undefined financial data objects that occur in the first category list are not provided to the production generative model and undefined financial data objects that occur in the second category list are provided to the production generative model.

* * * * *